United States Patent
Menninga

(10) Patent No.: US 7,039,862 B2
(45) Date of Patent: May 2, 2006

(54) TEXT SPACING ADJUSTMENT

(75) Inventor: Eric A. Menninga, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 37 days.

(21) Appl. No.: 10/144,127

(22) Filed: May 10, 2002

(65) Prior Publication Data

US 2004/0205642 A1    Oct. 14, 2004

(51) Int. Cl.
*G06F 17/00* (2006.01)

(52) U.S. Cl. ...................... 715/518; 715/519

(58) Field of Classification Search ............... 715/518, 715/519, 529, 517
See application file for complete search history.

(56) References Cited

U.S. PATENT DOCUMENTS

| | | | |
|---|---|---|---|
| 4,284,975 A * | 8/1981 | Odaka | 382/185 |
| 4,291,381 A * | 9/1981 | Siebeck | 715/519 |
| 4,591,999 A * | 5/1986 | Logan | 715/519 |
| 4,608,664 A * | 8/1986 | Bartlett et al. | 358/1.2 |
| 4,833,627 A | 5/1989 | Leszczynski | |
| 5,018,083 A | 5/1991 | Watanabe et al. | |
| 5,175,806 A | 12/1992 | Muskovitz et al. | |
| 5,287,443 A | 2/1994 | Mameda et al. | |
| 5,399,029 A | 3/1995 | Muraoka et al. | |
| 5,416,898 A | 5/1995 | Opstad et al. | |
| 5,432,890 A * | 7/1995 | Watanabe | 715/519 |
| 5,500,931 A | 3/1996 | Sonnenschein | |
| 5,501,538 A * | 3/1996 | Sawada et al. | 400/304 |
| 5,548,700 A | 8/1996 | Bagley et al. | |
| 5,579,471 A | 11/1996 | Barber et al. | |
| 5,581,670 A | 12/1996 | Bier et al. | |
| 5,617,115 A | 4/1997 | Itoh et al. | |
| 5,724,072 A | 3/1998 | Freeman et al. | |
| 5,724,596 A * | 3/1998 | Lathrop | 715/519 |
| 5,740,456 A | 4/1998 | Harel et al. | |
| 5,778,403 A | 7/1998 | Bangs | |
| 5,802,532 A * | 9/1998 | Nakayama et al. | 715/519 |
| 5,803,629 A | 9/1998 | Neville et al. | |
| 5,805,167 A | 9/1998 | Van Cruyningen | |
| 5,809,166 A * | 9/1998 | Huang et al. | 382/178 |

(Continued)

FOREIGN PATENT DOCUMENTS

JP          61-282974          12/1986

(Continued)

OTHER PUBLICATIONS

Hirschberg, D.S. et al., "New Applications of Failure Functions", *Journal of the Association for Computing Machinery*, vol. 34, No. 3, Jul. 1987, pp. 616-625.

(Continued)

*Primary Examiner*—Sanjiv Shah
(74) *Attorney, Agent, or Firm*—Fish & Richardson P.C.

(57) ABSTRACT

Method and apparatus, including computer program products, implementing and using techniques for adjusting spacing between characters in a line of text. A plurality of character classes are specified based on user input. A character class from the plurality of character classes is assigned to a character of a pair of characters in the line. Spacing between characters of the pair of characters is adjusted based on the assigned character class. Method and apparatus, including computer program products, implementing and using techniques for selecting rules for spacing adjustment in a line of text, and method and apparatus, including computer program products, implementing and using techniques for evaluating line layout are also described.

44 Claims, 6 Drawing Sheets

U.S. PATENT DOCUMENTS

| | | | |
|---|---|---|---|
| 5,937,420 A * | 8/1999 | Karow et al. ............... | 715/518 |
| 6,088,520 A | 7/2000 | Taoka et al. | |
| 6,252,607 B1 | 6/2001 | Babcock | |
| 6,321,243 B1 | 11/2001 | Ballard | |
| 6,330,577 B1 | 12/2001 | Kim | |
| 6,359,630 B1 | 3/2002 | Morse et al. | |
| 6,426,751 B1 | 7/2002 | Patel et al. | |
| 6,504,544 B1 | 1/2003 | Hollingsworth et al. | |
| 6,510,441 B1 | 1/2003 | Kenninga ................... | 715/521 |
| 6,624,814 B1 | 9/2003 | Karow et al. | |
| 6,626,960 B1 | 9/2003 | Gillam | |
| 6,886,133 B1 | 4/2005 | Bailey et al. | |
| 2001/0048764 A1 | 12/2001 | Betrisey et al. | |
| 2002/0062324 A1 | 5/2002 | McCully et al. | |

FOREIGN PATENT DOCUMENTS

| | | | |
|---|---|---|---|
| JP | 01-125656 | | 5/1989 |
| JP | 1-271275 | | 10/1989 |
| JP | 02-213983 | | 8/1990 |
| JP | 04-052871 | | 2/1992 |
| JP | 05224651 A | * | 9/1993 |
| JP | 06-20026 | | 1/1994 |
| JP | 06-96174 | | 4/1994 |
| JP | 06-149806 | | 5/1994 |
| JP | 07096594 A | * | 4/1995 |
| JP | 07-149005 | | 6/1995 |
| JP | 07-182303 | | 7/1995 |
| JP | 8-137871 | | 5/1996 |
| JP | 8-161309 | | 6/1996 |
| JP | 08-194832 | | 7/1996 |
| JP | 08-314655 | | 11/1996 |
| JP | 10-069477 | | 3/1998 |
| JP | 10-222499 | | 8/1998 |
| JP | 11-102446 | | 4/1999 |
| JP | 11-353491 | | 12/1999 |
| JP | 2000-267645 | | 9/2000 |
| JP | 2001-281835 | | 10/2001 |
| JP | 2001-297077 | | 10/2001 |
| JP | 2003-523015 | | 7/2003 |

OTHER PUBLICATIONS

U.S. Appl. No. 09/964,293, filed Sep. 25, 2001, Shade et al.
Peter Karow, "Extending Control of Digital Typography", Visible Language, 32.2, Visible Language 1998, pp. 100-127 (671001 IDS Sep. 30, 2004).

* cited by examiner

TEXT SPACING ADJUSTMENT

BACKGROUND

The present invention relates to text spacing adjustment for desktop publishing. During desktop publishing of an electronic text, characters of the text are composed into lines, and in each line, spacings are set between adjacent characters. In general, each character has a default spacing value. Default spacing values, however, are only provisional, and spacings can be adjusted during line composition. A different spacing can be set according to the attributes of the text or intentions of a user. For example, the required spacing can depend on one or more of the following: the position of a character in a line or in a word, the preceding and following characters, line justification, language environment, and aesthetic considerations. In texts with Roman characters, a spacing adjustment technique typically uniformly rescales spacings in a line of characters, for example, based on the total number of characters or words in the line. Alternatively, local spacings can be manually changed by a user. In texts with Japanese characters, however, spacings typically follow the guidelines of a government-issued JIS document 4051 for Japanese line composition. According to these guidelines, spacings are based on pre-defined classifications of Japanese characters. When adhering to this classification, each spacing is adjusted individually, because the adjustment depends on the character classes corresponding to the characters preceding and following the spacing.

SUMMARY

In general, in one aspect, this invention provides method and apparatus, including computer program products, implementing and using techniques for adjusting spacing between characters in a line of text. The method includes specifying a plurality of character classes based on user input. A character class from the plurality of character classes is assigned to a character of a pair of characters in the line. Spacing between characters of the pair of characters is adjusted based on the assigned character class.

Advantageous implementations of the invention can include one or more of the following features. A plurality of rules for adjusting spacing between characters of the pair of characters can be defined based on the assigned character class. A priority can be assigned to a rule of the plurality of rules. The priority can characterize a preference to apply the rule of the plurality of rules. A rule of the plurality of rules can define one or more of the following: optimal spacing, maximum compression, and maximum expansion. The plurality of rules can be defined based on user input. A character of the pair of characters can be a Roman character. Spacing between characters of the pair of characters can be adjusted based on a character attribute. The character attribute can include one or more of the following attributes: font face, font type, and font size. Spacing between characters of the pair of characters can be adjusted based on a language environment. A character class in the plurality of character classes can be assigned to a character of the pair of characters based on user input.

In general, in another aspect, this invention provides method and apparatus, including computer program products, implementing and using techniques for selecting rules for spacing adjustment in a line of text. The method includes assigning a character class to a character of a pair of characters in a line of text. A rule from a plurality of rules is selected based on the assigned character class. Each rule in the plurality of rules is operable to adjust spacing between characters of the pair of characters.

Advantageous implementations of the invention can include one or more of the following features. Selecting a rule from the plurality of rules can include assigning priorities to rules of the plurality of rules. The priorities can characterize preferences to apply rules of the plurality of rules.

In general, in another aspect, this invention provides method and apparatus, including computer program products, implementing and using techniques for evaluating a line layout. The method includes selecting a set of rules for adjusting spacing between characters in a line of text. The set of rules includes a plurality of rules operable to adjust spacing between characters of a pair of characters. Each rule in the set of rules has a priority. A line layout of the line is evaluated based on the priorities of the rules of the set of rules.

Advantageous implementations of the invention can include one or more of the following features. A paragraph containing the line can be formatted based on the line layout evaluation.

In general, in another aspect, this invention provides method and apparatus, including computer program products, implementing and using techniques for adjusting spacing between characters of a pair of characters in a line of text. The method includes providing a plurality of rules. Each rule of the plurality of rules is operable to adjust spacing between characters of the pair of characters. Each rule of the plurality of rules has a priority. A preferred rule from the plurality of rules is selected based on the priority of the preferred rule. The preferred rule is applied to adjust spacing between characters of the pair of characters.

Advantageous implementations of the invention can include one or more of the following features. A priority level can be provided for selecting a preferred rule from the plurality of rules. Each rule of the plurality of rules can have a different priority. A preferred rule can be selected from the plurality of rules based on character attributes.

In general, in another aspect, this invention provides a spacing adjustment device for line composition in a desktop publishing device. The spacing adjustment device includes a user input receiving device, a character classification device, and a rule defining device. The character classification device is operable to provide a plurality of character classes based on user input. User input is received by the user input receiving device. The rule defining device is operable to provide a plurality of rules. The rules of the plurality of rules are operable to adjust spacing between characters in a line of text based on character classes.

Advantageous implementations of the invention can include one or more of the following features. The spacing adjustment device can include a prioritization device. The prioritization device is operable to assign priorities to rules in the plurality of rules.

The invention can be implemented to realize one or more of the following advantages. Spacing adjustment rules for electronic line composition can be easily specified when spacing rules are based on character classes. Character classes can be defined (e.g., by the user) in a very flexible manner. A character class can be based on character values, on one or more attributes that can be associated with a character, or on a combination of character values and character attributes. Character class-based rules allow the user to automatically and individually adjust each spacing between adjacent characters in a line. Different spacing rules can be defined for different language environments. When each spacing is individually addressed, spacing can be adjusted based on character attributes, such as font size, font face or font type. Character classes can be defined based on one or more of the attributes. More than one spacing rule can be provided for adjusting the same spacing in a line. More than one rule can be generated implicitly through the character classification, or explicitly by user definition. The spacing rules can be prioritized by the user or by an appropriate device. The priorities of the spacing rules allow the user to control electronic line composition. The user can set a priority level to select spacing rules with a particular priority. The selected spacing rules can be used to adjust spacings in a line or to evaluate a line layout. This line layout evaluation can be used to compose paragraphs.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like symbols in the various drawings indicate like elements.

DETAILED DESCRIPTION

Figure 1:
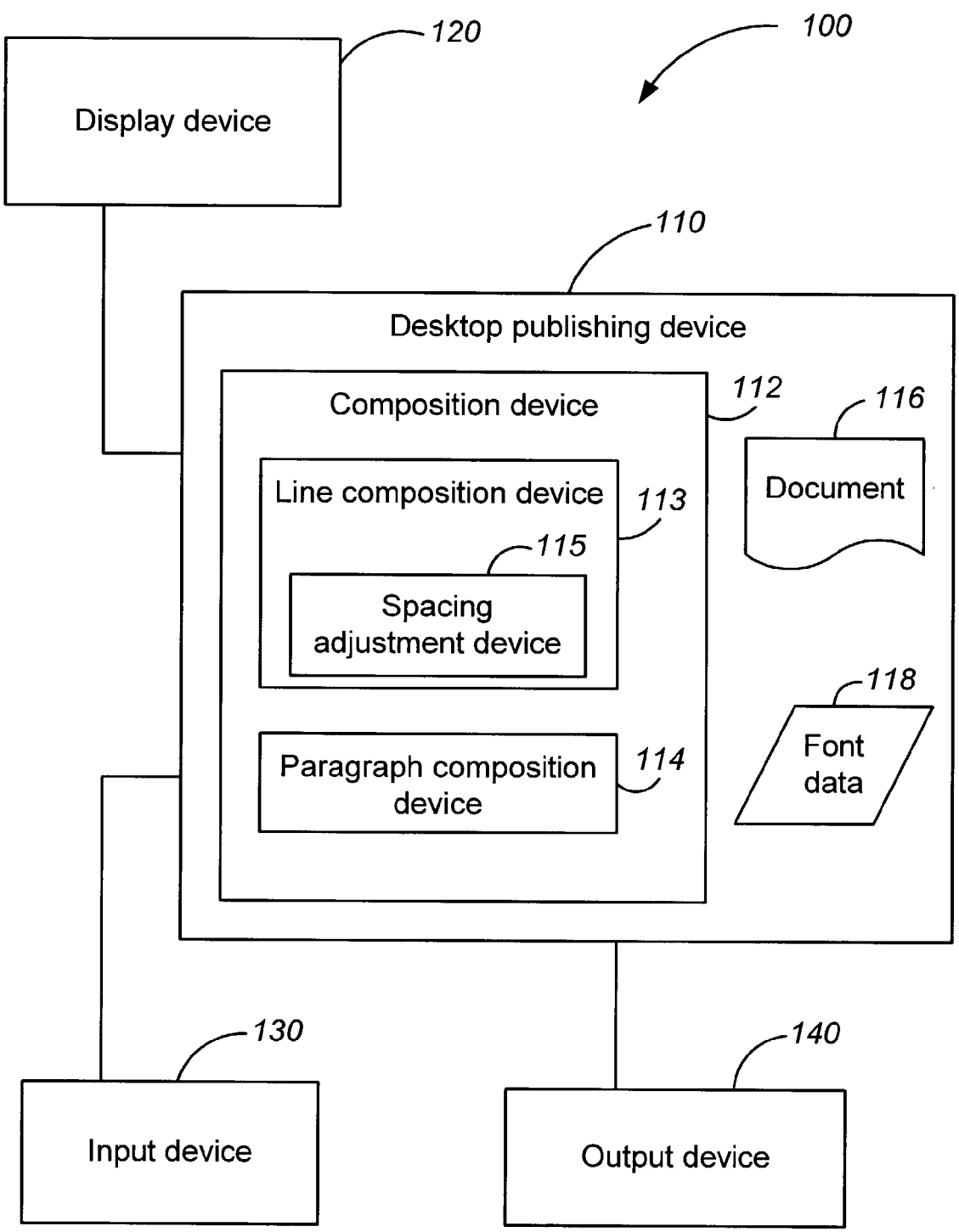
FIG. 1 is a schematic block diagram of a desktop publishing system.

As shown in FIG. 1 by a schematic block diagram, a desktop publishing system 100 can be operated in accordance with an implementation of the invention. The desktop publishing system 100 features a desktop publishing device 10, a display device 120, an input device 130, and an output device 140. The desktop publishing device 110 can be implemented, for example, in a computer program for formatting an electronic text for publishing, as described below. The formatted electronic text can be displayed on the display device 120, for example a computer screen, for interaction with a user. The user can give instructions and other data to the desktop publishing device by the input device 130, for example, a keyboard or a computer mouse. The instructions and data can be used to influence the text composition and, in particular, spacing adjustment. The composed text can be sent to the output device 140, for example, a printer.

The desktop publishing device 110 includes a composition device 112 that can compose lines and paragraphs from characters of an electronic text contained in an electronic document 116. The composition device 112 uses fonts stored in a font data file 118 to represent the characters of the electronic text. The characters are composed into lines by a line composition device 113 and the lines are composed into paragraphs by a paragraph composition device 114. During line composition, a spacing adjustment device 115 can adjust spacings between adjacent characters in a line.

Figure 2A:
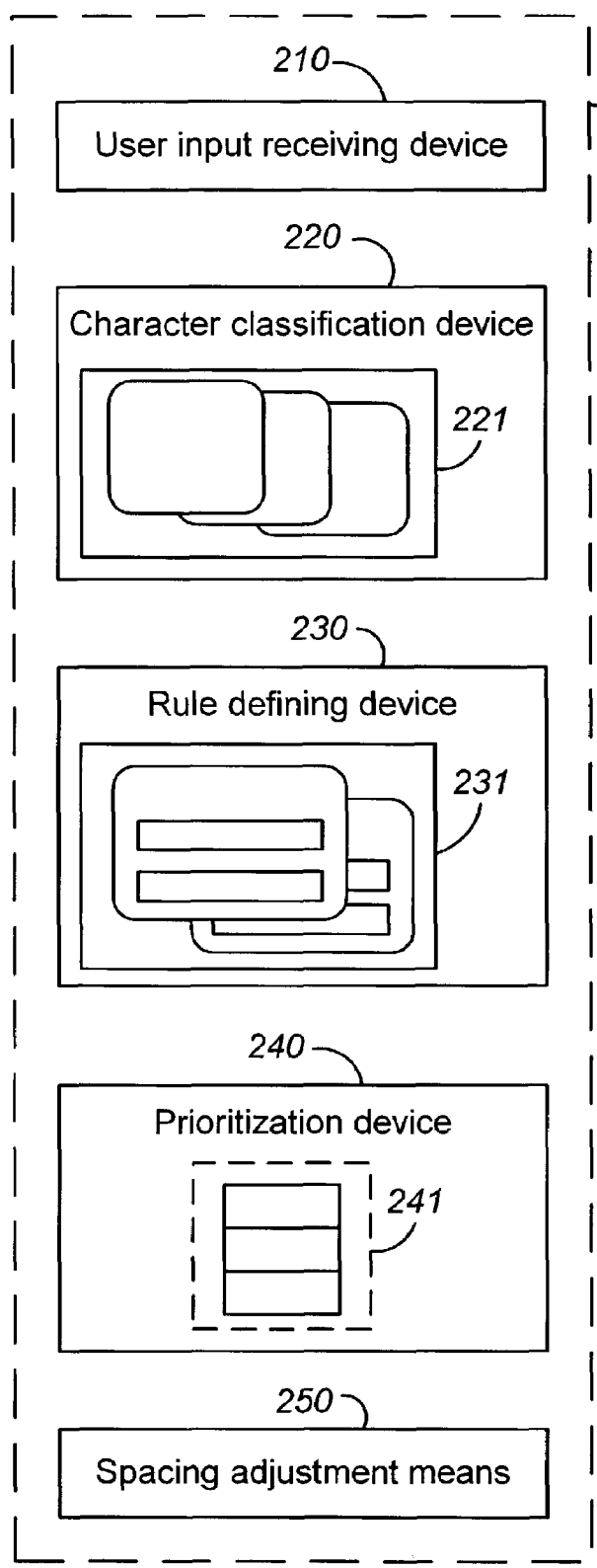
FIG. 2A is a schematic block diagram of a spacing adjustment device according to an implementation of the invention.
Figure 2B:
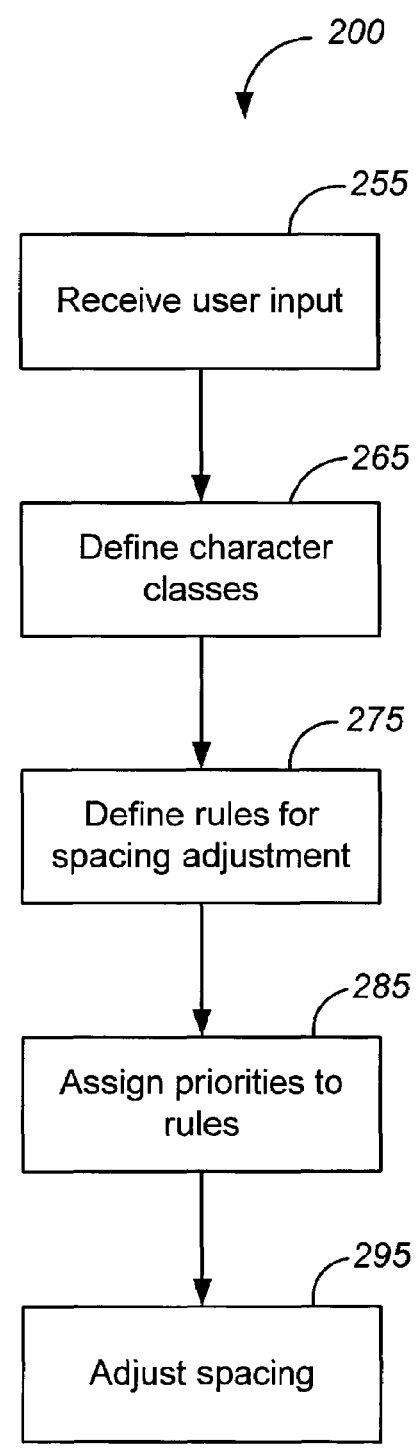
FIG. 2B is a flowchart showing an implementation of class-based spacing adjustment in accordance with the invention.

As shown in FIGS. 2A and 2B, an implementation 115' (FIG. 2A) of the spacing adjustment device 115 can adjust spacings between adjacent characters in a line, for example, as implemented by a method 200 (FIG. 2B). The implementation 115' includes a user input receiving device 210, a character classification device 220, a rule defining device 230, a prioritization device 240, and spacing adjustment means 250. These devices and means perform the steps of the spacing adjustment method 200 as explained below with reference to FIG. 2 and FIG. 3.

The user input receiving device 210 first receives user input (step 255) from a user, for example, through the input device 130. The character classification device 220 then specifies character classes based on the received user input (step 265). A character class is a user-defined set of one or more characters. As used herein, "character" refers to the general concept of a letter, number, symbol, ideograph or the like, without reference to its particular appearance (e.g., a particular font). The characters in a character class can, but are not required to, share one or more common features. These features can include a character value, for example, a Unicode or ASCII code value representing a particular character, or a character attribute, such as font face, a font type, and a font size. Although characters having different features can be members of the same character class or classes, character classes are preferably defined such that each instance of a character that shares a common set of features (e.g., the same character value and the same attribute values for a given set of character attributes) belongs to the same character class or classes.

The character classification device 220 can specify character classes based on user input. In the user input, the user can, for example: list characters that are part of or excluded from a certain character class; select character attributes that specify a character class; or select a pre-defined character class from a menu. The user can select a language environment (e.g., "American English", "French", or the like) for which a set of character classes has already been specified. According to the user input, the character classification device 220 can specify a set of character classes 221 that classify all or only certain characters of the electronic text. A particular character can be a member of only one character class, or belong to more than one character class.

Next, the character classes 221 are used by the rule defining device 230 to define spacing rules 231 for spacing adjustment (step 275). Optionally, the rule defining device 230 can define or alter the spacing rules 231 based on user input received, for example, by the user input receiving device 210 in step 255. In one implementation, the spacing rules 231 are described by one or more of the following rule parameters for adjusting a spacing between adjacent characters: an optimal spacing that describes a desired spacing other than the default spacing; a maximum compression that characterizes the minimum spacing; or a maximum expansion that characterizes the maximum spacing. The spacing rules 231 can adjust the spacing between two characters so that the adjustment depends on the character classes of the preceding character, the following character, or both characters on either side of the spacing. The character-class dependence can be used to group the spacing rules 231 into sub-groups. A sub-group can, for example, include spacing rules that adjust the spacing between members of two character classes. A sub-group of the spacing rules 231 can contain one or more spacing rules.

A prioritization device 240 then assigns priorities 241 to the spacing rules 231 (step 285). In particular, if a sub-group has two or more associated spacing rules, the assigned priorities can be used to select what spacing rule to apply during spacing adjustment, for example, as described with reference to FIG. 6. The priorities 241 can include one or more of the following priorities: an optimal priority that sets a spacing to an optimal spacing; a first priority that adjusts spacing to close to optimal spacing; a second, third, and so on, priorities that describe an order of decreasing preference for using the spacing rules 231. Optionally, the prioritization device 240 can assign the priorities 241 to the spacing rules 231 based on user input, received, for example, in step 255 by the user input receiving device 210. Finally, spacings in a line are adjusted (step 295), as will be discussed in detail below with reference to FIG. 4.

Figure 3A:
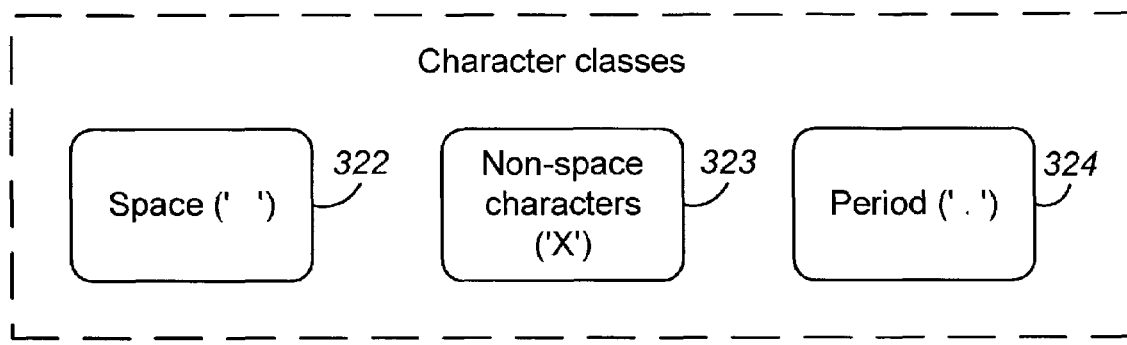
FIGS. 3A, 3B, and 3C are schematic block diagrams showing how character classes, rules, and priorities can be implemented for spacing adjustment in accordance with the invention.
Figure 3B:
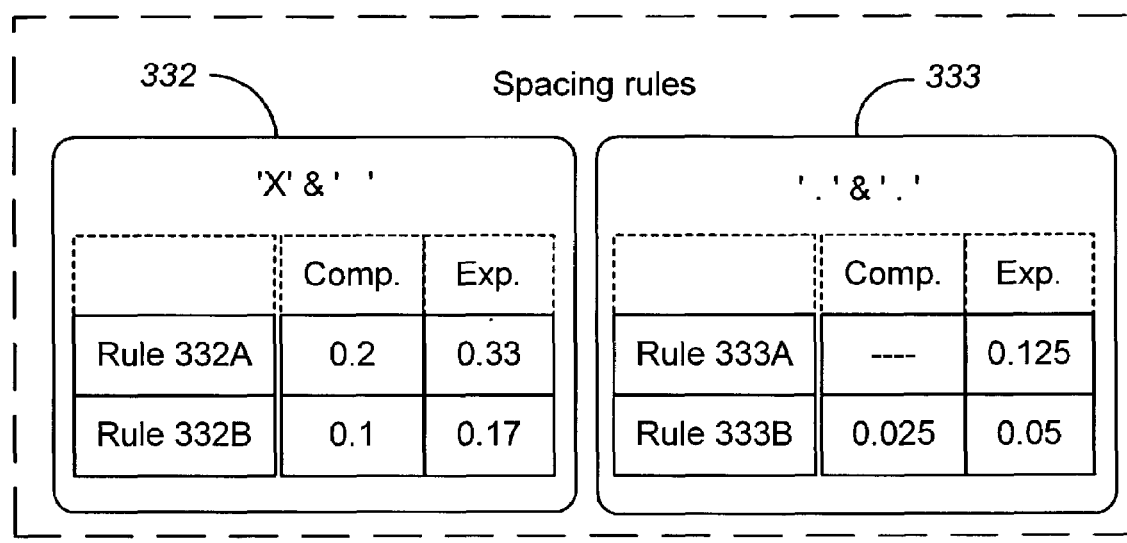
Figure 3C:
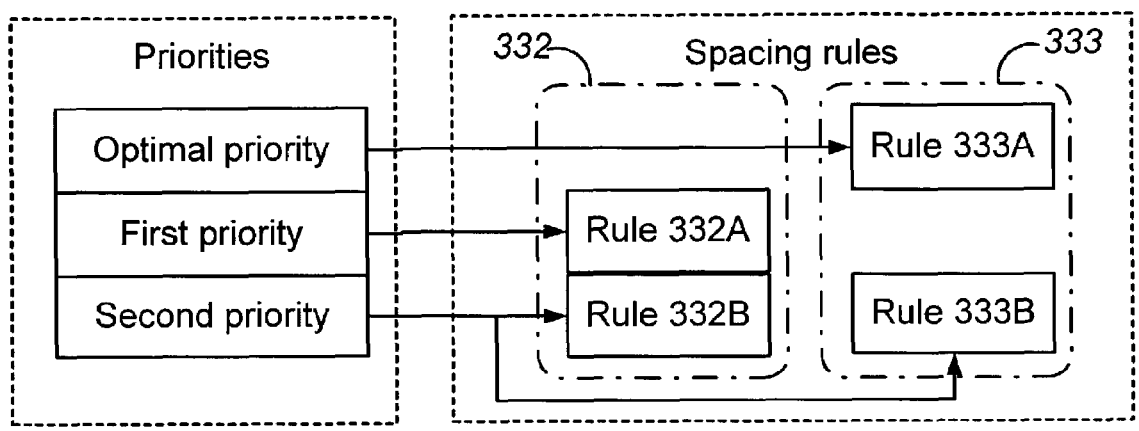

FIGS. 3A–3C illustrate an exemplary implementation of character classification and prioritization. In this example, as shown in FIG. 3A, three character classes are defined. A space class 322, denoted by ' ', has only one member (the space character). A non-space characters class 323, denoted by 'X', includes all characters but the space character. A period class 324, denoted by '.', has only one member (the period character itself). The character classes 322–324 classify all characters of an electronic text, because the non-space characters class 323 includes all non-space characters. In particular, the non-space characters class 323 also includes the period character that is a member of the period class 324 as well.

As shown in FIG. 3B, in an exemplary implementation, spacing rules are divided into two sub-groups. A sub-group 332 contains spacing rules for adjusting spacing between a member of the non-space characters class 323 followed by a member of the space character class 322. A sub-group 333 contains spacing rules for adjusting spacing between two members of the period class 324. Spacing rules 332A, 332B, and 333B are described by a maximum compression rule parameter (column "Comp." in FIG. 3B) and a maximum expansion rule parameter (column "Exp." in FIG. 3B). Spacing rule 333A only has a maximum expansion rule parameter. These rule parameters describe the maximum compression or expansion of a spacing. In the example shown in FIG. 3B, the numbers represent fractions of the width of a space character. For example, if a non-space character is followed by a space character, the spacing rule 332A allows that the space character be compressed by 20%, or expanded by 33% of the space character width of the selected font.

In an example of prioritization, illustrated in FIG. 3C, priorities are assigned to the spacing rules 332A–333B: the spacing rule 333A has optimal priority, the spacing rule 332A has first priority, and the spacing rules 332B and 333B have second priority. From optimal to second priority, this order can describe decreasing preference for applying the spacing rules. In this example, the spacing rule 333A has optimal priority, and is characterized by a maximum expansion only. During spacing adjustment in a line, the spacing rule 333A can be applied without further selection to obtain an optimal spacing between two period characters in the line: in this case, 12.5% of a standard space character. If, for some reason, further spacing adjustments are required in the line, spacing rules with first priority can be applied. At this priority level, as shown in FIG. 3C, the spacing rule 332A can be applied between adjacent pairs of non-space and space characters in the line. If these adjustments are still unsatisfactory, the spacing rules 332B and 333B can be applied for corresponding spacings in the line, since these spacing rules have second priority.

Figure 4:
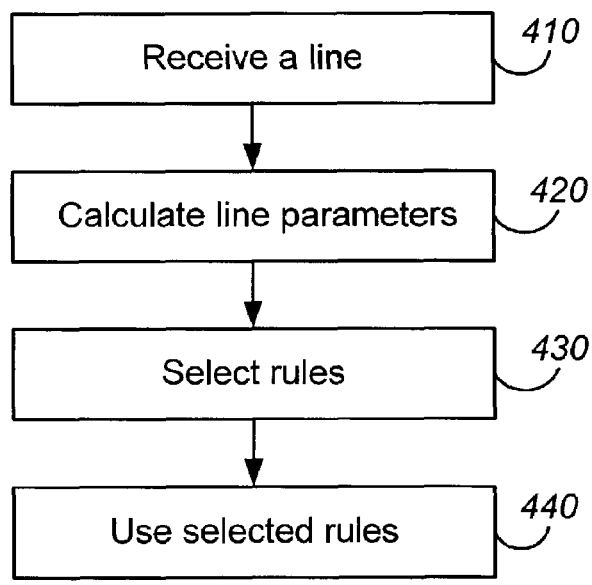
FIG. 4 is a flowchart showing an implementation of a method for adjusting spacing between adjacent characters in a line in accordance with the invention.

As shown in FIG. 4, in one implementation of the invention, the spacing adjustment means 250 can perform the final step 255 of the process 200 (see FIGS. 2a–2b), that is, adjust spacing, for example, in order to justify a line of an electronic text. A line is received (step 410), and certain line parameters of the line are calculated (step 420). The calculation can be implemented as described below with reference to FIG. 5. In the case of line justification, the line parameters to describe the entire line include: an optimal line width characterizing a line width when all spacings in the line are optimal; a maximum line expansion or compression characterizing a maximum expansion or compression of the line available by the spacing rules for adjusting spacings in the line. Other line parameters can be calculated as well; for example, a composite priority parameter describing the sum of the priorities of all the spacing rules that were applied to obtain a line layout of a line. Optionally, the line parameters can be obtained with the restriction that only spacing rules with a particular priority can be used. Based on the line parameters, spacing rules are selected (step 430). The selection can be carried out as will be described below with reference to FIG. 6. Finally, the selected spacing rules are used to adjust spacing in the line (step 440).

Figure 5:
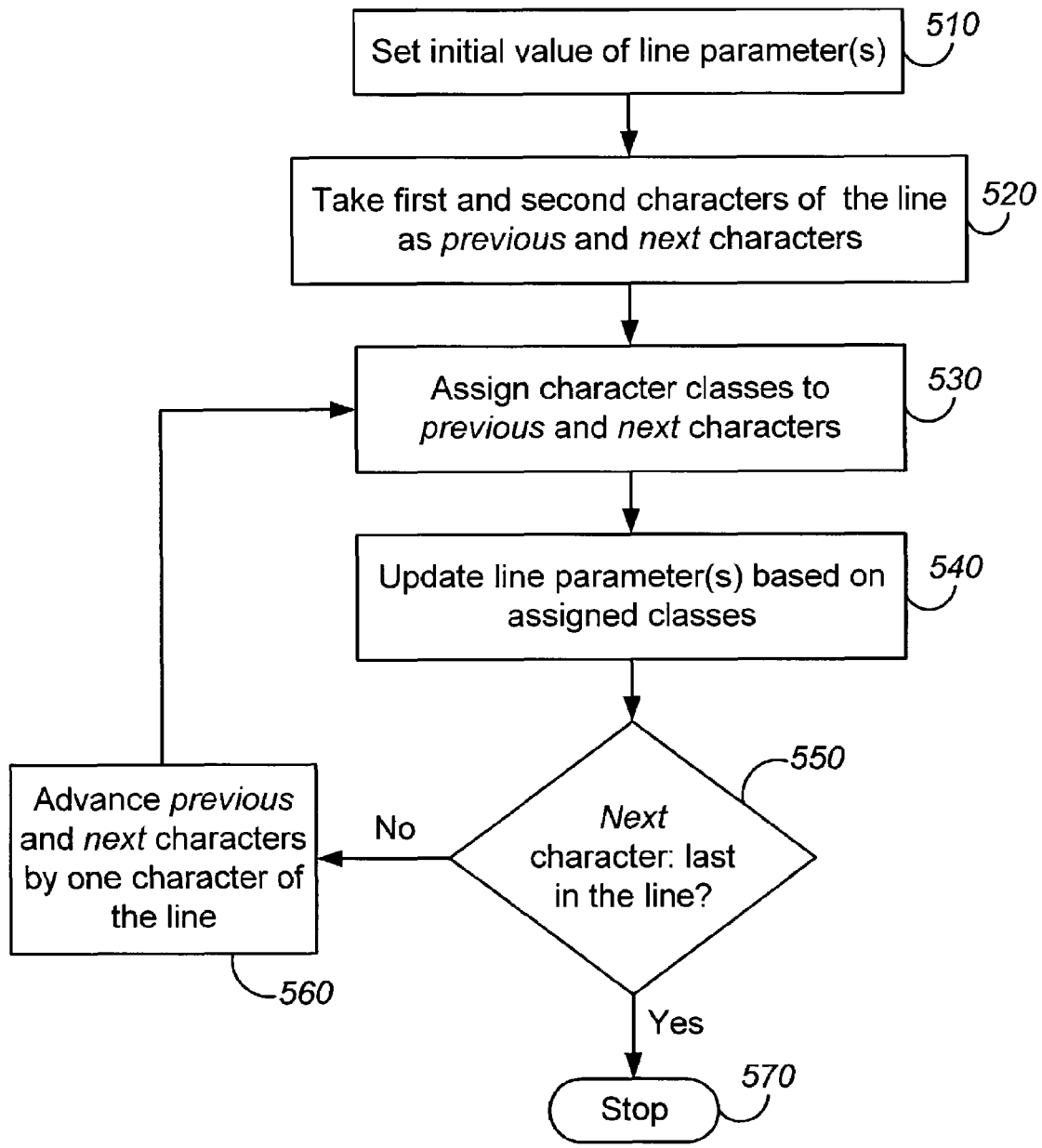
FIG. 5 is a flowchart showing a method for calculating line parameters according to an implementation of the invention.

As shown in FIG. 5, in one implementation of the invention, line parameters are calculated for spacing adjustment in a line (see step 420 in FIG. 4). An initial value is set for each line parameter to be calculated (step 510). A previous character is defined as the first character of the line, and a next character is defined as the second character of the line (step 520). Character classes are then assigned to the previous and next characters (step 530).

In one implementation of the character class assignment, only one character class is assigned to a character. For example, if a character is a member of only one character class, this character class can be automatically assigned to the character. If, on the other hand, a character is a member of more than one character class, a character class can be assigned to the character based on additional information. For example, class assignment can take into account if there are available spacings rules when a particular character class is assigned to the character. Alternatively, the class assignment can be based on user input.

The assigned character classes are used to select rules to update the line parameters (step 540). In one implementation of the line parameter update, the previous and next characters have assigned character classes that also define a sub-group of the spacing rules: this sub-group contains the spacing rules that adjust spacing between characters of the assigned character classes. These spacing rules have rule parameters that can be used to update the line parameters. For example, a spacing rule can have a maximum expansion rule parameter that can update the maximum line expansion parameter of the line. In a similar way, the update step 540 can update other line parameters, such as the optimal line width, the maximum line compression, or a composite priority of the line. By taking into account the priorities of the spacing rules, the line parameters can be updated separately for different priorities.

After the line parameters have been updated, the next character is examined to determine if the next character is the last character in the line (step 550). If the next character is not the last character in the line, the previous and next characters are advanced by one character in the line (step 560), that is, the next character is advanced to become the previous character, and the next character is now defined as the following character in the line. With the new previous and next characters, steps 530–550 are repeated, until it is determined in step 550 that the next character is the last character in the line. The calculation is then finished (step 570).

Figure 6:
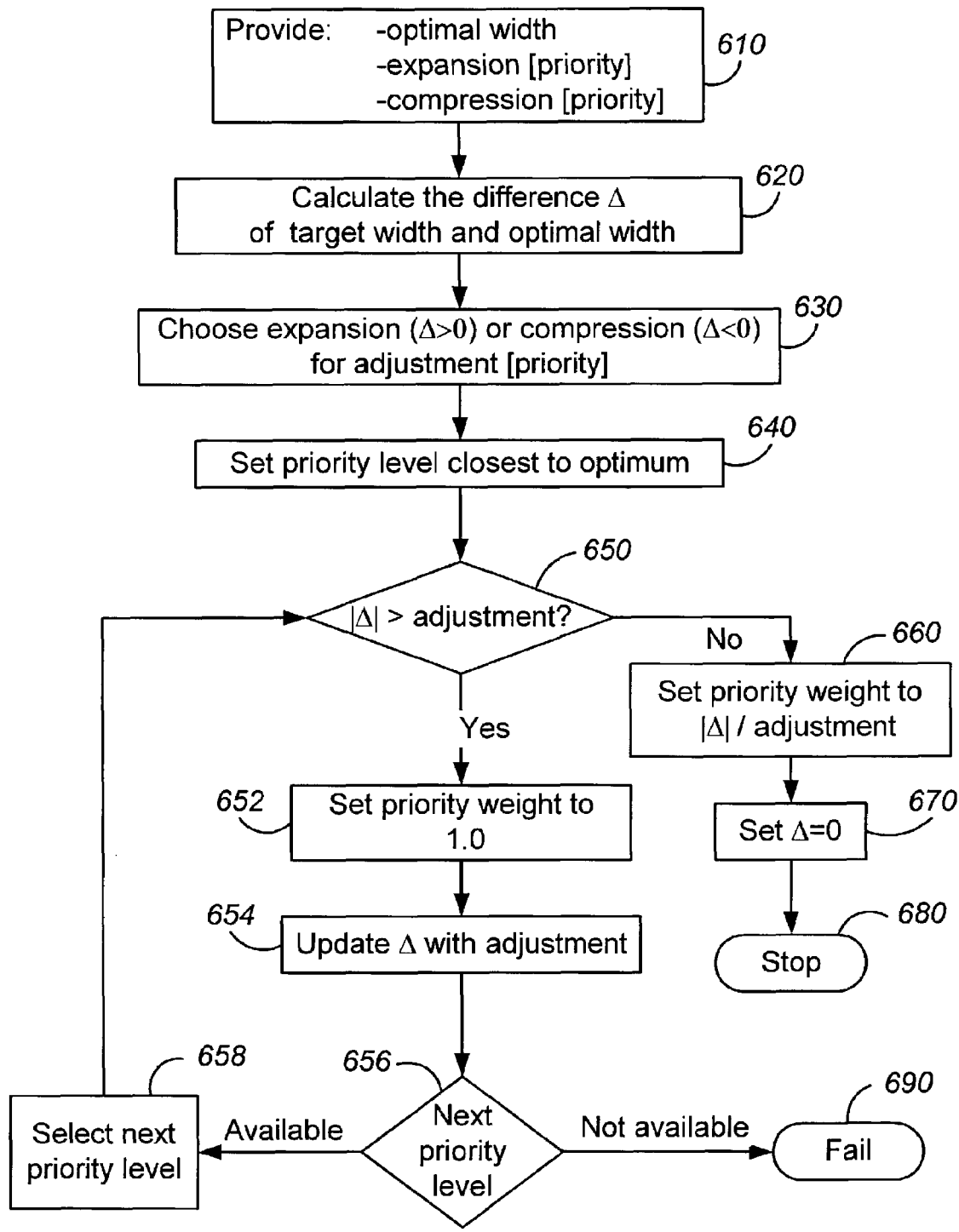
FIG. 6 is a flowchart showing a method for selecting rules for line justification according to an implementation of the invention.

As shown in FIG. 6, in one implementation of the invention, spacing rules are selected for line justification of a line (see step 430 in FIG. 4). First, line parameters are provided for the line justification (step 610): an optimal line width, maximum line expansions and compressions that are available for different priorities. These line parameters can be obtained, for example, through the method described above with reference to FIG. 4. Next, a target line width is compared with the optimal line width, and a difference Δ of the two widths is calculated (step 620). The target line width describes the targeted final line width after the line is justified. Depending on the difference Δ, an adjustment table is defined (step 630). If the target line width is bigger than the optimal line width (Δ>0), the adjustment table uses the maximum line expansion parameters. Otherwise (Δ<0, or Δ=0), the adjustment table uses the maximum line compression parameters. If the difference Δ is zero, optionally, the adjustment table can use the maximum line expansion parameters as well. The adjustment table can be organized to show the maximum adjustments, that is, expansion or compression, for different priorities. In order to select from these adjustments, a current priority level is defined, and set to first priority, i.e. the priority closest to the optimum priority (step 640). By changing the current priority level, different spacing rules can be selected for spacing adjustment.

Next, the spacing rules for spacing adjustment are selected by changing the current priority level to the next priority until the line can be justified. First (step 650), the absolute value of the difference Δ is compared with the maximum adjustment for the current priority level, which is the first priority after the step 640. If the absolute value |Δ| is greater than the maximum adjustment for the current priority level, a priority weight 1.0 is assigned to the current priority level (step 652). The priority weight 1.0 means that spacing rules with this priority level are applied with their maximum adjustment. Next, the difference Δ is updated, as if these spacing rules were already applied (step 654). Since the updated difference Δ is still not zero, a next priority level is searched for with spacing rules that are operable to justify the line (step 656). If there is no such priority level, the available rules fail to justify the line (step 690) and the process ends; otherwise, the current priority level is set to the next available priority level (step 658), and the process returns to step 650 where a comparison of the updated difference Δ and the maximum adjustment for the new current priority level is performed.

If the comparison step 650 finds that the difference Δ has a smaller value than the maximum adjustment of the current priority level, the process calculates a priority weight (step 660). The difference Δ is divided by the maximum adjustment for the current priority level. The priority weight is assigned to the current priority level, and gives a fraction of the maximum adjustment necessary to justify the line. Since the line now can be justified, the difference Δ is set to zero (step 670) and the process ends (step 680).

When the priority weights are obtained, for example, by the rule selection, the spacing rules can be used to justify the line. In one implementation, the spacing rules can be applied with a method similar to the one described above for calculating the line parameters (see discussion accompanying FIG. 5). When the method individually addresses a spacing (steps 530–560), the spacing can be adjusted according to the spacing rules and the priority weights assigned to the priority, instead of updating the line parameters (step 540).

Furthermore, in one implementation of the invention, a line layout can be evaluated based on the total priority of the spacing rules that are selected to justify a line. The layout evaluation can be implemented by a line parameter calculating method, for example, as shown in FIG. 5. The line parameter can be the composite priority parameter of the line. The composite priority parameter can be updated in step 540 based on priorities of the spacing rules that are selected to justify the line. For example, the update step 540 can add the priority weights of the selected spacing rules to the composite priority parameter. Optionally, the line layout evaluation can be used for paragraph composition.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (invention-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A method for adjusting spacing between characters in a line of text, comprising:

receiving, in an desktop publishing system, input from a user of the system specifying a character classification that defines a plurality of character classes, each character class in the plurality of character classes including one or more individual characters as members of the class, wherein at least one character is a member of more than one character classes in the plurality of character classes;

determining whether a character of a pair of characters in a line of text is a member of only one character class or more than one character class in the plurality of character classes;

if the character is a member of only one character class, assigning the only one character class to the character of the pair of characters in the line of text;

if the character is a member of more than one character class, assigning exactly one of the more than one character classes to the character; and adjusting spacing between characters of the pair of characters based on the character class assigned to a first character, a second character, or both characters of the pair of characters.

2. The method of claim 1, further comprising:

defining a plurality of rules each of which is operable to adjust spacing between characters of the pair of characters based on the assigned character class; and selecting a rule from the plurality of rules to define a line layout for the line of text;

wherein adjusting spacing between characters of the pair of characters includes applying the selected rule to adjust the spacing between characters of the pair of characters.

3. The method of claim 2, further comprising:

assigning a different priority value to each rule of the plurality of rules, the different priority values defining an order of preference to apply the rules of the plurality of rules, wherein selecting a rule from the plurality of rules includes selecting a rule from the plurality of rules based on the assigned priority values.

4. The method of claim 2, wherein a rule of the plurality of rules defines one or more of the following: an optimal spacing, a maximum compression, and a maximum expansion between adjacent characters.

5. The method of claim 2, wherein the plurality of rules is defined based on user input.

6. The method of claim 2, wherein the line layout is specified by one or more line parameters that include an optimal line width, a maximum line expansion or a maximum line compression.

7. The method of claim 1, wherein a character of the pair of characters is a Roman character.

8. The method of claim 1, wherein receiving user input specifying the character classification includes receiving user input assigning characters to character classes based on a character attribute.

9. The method of claim 8, wherein the character attribute includes one or more of the following attributes: font face, font type, and font size.

10. The method of claim 1, wherein receiving user input specifying the character classification includes receiving user input selecting a predefined character classification according to a language environment.

11. The method of claim 1, wherein assigning exactly one of the more than one character classes to the character of the pair of characters comprises: receiving user input selecting the exactly one of the more than one character classes.

12. The method of claim 1, wherein:

specifying the character classification includes, for each character class in the plurality of character classes, specifying character codes of the characters that are members of the class.

13. A method for selecting rules for spacing adjustment in a line of text, comprising:

receiving, in a desktop publishing system, input from a user of the system specifying a character classification that defines a plurality of character classes, each character class in the plurality of character classes including one or more individual characters as members of the class, wherein at least one character is a member of more than one character class of the plurality of character classes;

determining whether a character of a pair of characters in a line of text is a member of only one character class or more than one character class in the plurality of character classes;

if the character is a member of only one character class, assigning the character class to the character of a pair of characters in a line of text;

if the character is a member of more than one character class, assigning exactly one of the more than one character classes to the character of the pair of characters in the line of text;

identifying a plurality of rules based on the assigned character class, each rule in the plurality of rules being operable to adjust spacing between characters of the pair of characters; and selecting exactly one rule from the plurality of rules to adjust spacing between characters of the pair of characters.

14. The method of claim 13, further comprising:

assigning a different priority value to each rule of the plurality of rules, the different priority values defining an order of preference to apply rules of the plurality of rules, wherein selecting exactly one rule from the plurality of rules includes selecting the rule from the plurality of rules based on the assigned priority values.

15. The method of claim 13, wherein assigning exactly one of the more than one character classes comprises:

receiving user input selecting exactly one of the more than one character classes.

16. A method for evaluating a line layout, comprising:

specifying a character classification that defines a plurality of character classes, each character class in the plurality of character classes including one or more individual characters as members of the class;

selecting one or more rules for adjusting spacing between characters in a line of text to define a line layout, each selected rule being assigned to a respective pair of characters in the line of text according to at least one character class and each rule having a priority value;

calculating a composite priority parameter value for the line from all the priority values of all the selected rules, the composite priority parameter being a sum of the priority values of all the selected rules; and evaluating the line layout of the line based on the composite priority parameter value.

17. The method of claim 16, further comprising:
formatting a paragraph based on the line layout evaluation, the paragraph containing the line.

18. The method of claim 16, wherein:
calculating the composite priority parameter value includes calculating a sum of all the priority values of all the selected rules.

19. A method for adjusting spacing between characters of pairs of characters in a line of text, comprising:
specifying a character classification that defines a plurality of character classes, each character class in the plurality of character classes including one or more individual characters as members of the class;
providing a plurality of rules for adjusting spacing between pairs of characters in the line of text to define a line layout, the plurality of rules including two or more rules that are operable to adjust spacing between characters of a first pair of characters in the line of text according to at least one character class, each rule of the two or more rules having a different priority value, the different priority values specifying an order of preference for the two or more rules;
using the different priority values of the two or more rules to select a preferred rule from the two or more rules; and
applying the preferred rule to adjust spacing between characters of the first pair of characters.

20. The method of claim 19, wherein using the different priority values of the two or more rules to select the preferred rule includes:
providing a priority level for the line layout; and
selecting the preferred rule from the two or more rules based on the priority level for the line layout.

21. The method of claim 19, wherein selecting a preferred rule from the two or more rules further comprises:
selecting a preferred rule from the two or more rules based on character attributes.

22. A spacing adjustment device for line composition in a desktop publishing device, comprising:
a user input receiving device in a desktop publishing system;
a character classification device operable to specify a character classification based on user input received by the user input receiving device of the desktop publishing system, the character classification defining a plurality of character classes, each character class in the plurality of character classes including one or more individual characters as members of the class, wherein at least one character is a member of more than one character classes class in the plurality of character classes, the character classification device being configured to determine whether a character in a line of text is a member of only one character class or more than one character class; and
a rule defining device operable to assign a plurality of rules to a particular pair of character classes, the rules of the plurality of rules being operable to adjust spacing in the line of text between pairs of characters that are assigned to the respective character classes in the particular pair of character classes.

23. The spacing adjustment device of claim 22, further comprising:
a prioritization device operable to assign different priority values to rules in the plurality of rules, the different priority values defining an order of preference for the plurality of rules.

24. A computer program product, tangibly stored on a computer-readable medium, for adjusting spacing between characters in a line of text, comprising instructions operable to cause a programmable processor to:
receive, in a desktop publishing system, input from a user of the system specifying a character classification that defines a plurality of character classes, each character class in the plurality of character classes including one or more individual characters as members of the class, wherein at least one character is a member of more than one character class in the plurality of character classes;
determine whether a character of a pair of characters in a line of text is a member of only one character class or more than one character class in the plurality of character classes;
if the character of the pair of characters is a member of only one character class, assign the only one character class to the character of the pair of characters in the line of text;
if the character of the pair of characters is a member of more than one character class, assign exactly one of the more than one character classes to the character of the pair of characters in the line of text; and
adjust spacing between characters of the pair of characters based on the character class assigned to a first character, a second character, or both characters of the pair of characters.

25. The computer program product of claim 24, further comprising instructions operable to cause a programmable processor to:
define a plurality of rules each of which is operable for adjusting spacing between characters of the pair of characters based on the assigned character class; and
select a rule from the plurality of rules to define a line layout for the line of text;
wherein the instructions operable to cause the programmable processor to adjust spacing between characters of the pair of characters include instructions operable to cause the programmable processor to apply the selected rule to adjust the spacing between characters of the pair of characters.

26. The computer program product of claim 25, further comprising instructions operable to cause a programmable processor to:
assign a different priority value to each rule of the plurality of rules, the different priority values defining an order of preference to apply the rules of the plurality of rules,
wherein the instructions operable to cause the programmable processor to select a rule from the plurality of rules include instructions operable to cause the programmable processor to select a rule from the plurality of rules based on the assigned priority values.

27. The computer program product of claim 25, wherein a rule of the plurality of rules defines one or more of the following: an optimal spacing, a maximum compression, and a maximum expansion between adjacent characters.

28. The computer program product of claim 25, wherein the plurality of rules is defined based on user input.

29. The computer program product of claim 24, wherein a character of the pair of characters is a Roman character.

30. The computer program product of claim 25, wherein the line layout is specified by one or more line parameters that include an optimal line width, a maximum line expansion or a maximum line compression.

31. The computer program product of claim 24, wherein instructions operable to cause a programmable processor to receive user input specifying the character classification include instructions operable to cause a programmable processor to receive user input assigning characters to character classes based on a character attribute.

32. The computer program product of claim 31, wherein the character attribute includes one or more of the following attributes: font face, font type, and font size.

33. The computer program product of claim 24, wherein instructions operable to cause a programmable processor to receive user input specifying the character classification include instructions operable to cause a programmable processor to receive user input selecting a predefined character classification according to a language environment.

34. The computer program product of claim 24, wherein instructions operable to cause a programmable processor to assign exactly one of the more than one character classes to the character of the pair of characters comprise instructions operable to cause a programmable processor to receive user input selecting the exactly one from the more than one character classes.

35. The computer program product of claim 24, wherein the instructions operable to cause a programmable processor to specify the character classification include instructions operable to cause a programmable processor to:
specify for each character class in the plurality of character classes character codes of the characters that are members of the class.

36. A computer program product, tangibly stored on a computer-readable medium, for selecting rules for spacing adjustment in a line of text, comprising instructions operable to cause a programmable processor to:
receive, in a desktop publishing system, input from a user of the system specifying a character classification that defines a plurality of character classes, each character class in the plurality of character classes including one or more individual characters as members of the class, wherein at least one character is a member of more than one character class in the plurality of character classes;
determine whether a character of a pair of characters in a line of text is a member of only one character class or more than one character class in the plurality of character classes;
if the character of the pair of characters is a member of only one character class, assign the character class to the character of a pair of characters in a line of text;
if the character of the pair of characters is a member of more than one character class, assign exactly one of the more than one character classes to the character of the pair of characters in the line of text;
identify a plurality of rules based on the assigned character class, each rule in the plurality of rules being operable to adjust spacing between characters of the pair of characters; and
select exactly one rule from the plurality of rules to adjust spacing between characters of the pair of characters.

37. The computer program product of claim 36, further comprising instructions operable to cause a programmable processor to:
assign a different priority value to each rule of the plurality of rules, the different priority values defining an order of preference to apply rules of the plurality of rules, wherein
the instructions operable to cause a programmable processor to select exactly one rule from the plurality of rules include instructions operable to cause a programmable processor to select the rule from the plurality of rules based on the assigned priority values.

38. The computer program product of claim 36, wherein instructions operable to cause a programmable processor to assign exactly one of the more than one character classes comprise instructions operable to cause a programmable processor to receive user input selecting exactly one of the more than one character classes.

39. A computer program product, tangibly stored on a computer-readable medium, for evaluating a line layout, comprising instructions operable to cause a programmable processor to:
specify a character classification that defines a plurality of character classes, each character class in the plurality of character classes including one or more individual characters as members of the class;
select one or more rules for adjusting spacing between characters in a line of text to define a line layout, each selected rule being assigned to a respective pair of characters in the line of text according to at least one character class and having a priority value;
calculate a composite priority parameter value for the line from all the priority values of all the selected rules, the composite priority parameter being a sum of the priority values of all the selected rules; and
evaluate the line layout of the line based on the composite priority parameter value.

40. The computer program product of claim 39, further comprising instructions operable to cause a programmable processor to:
format a paragraph based on the line layout evaluation, the paragraph containing the line.

41. The computer program product of claim 39, wherein the instructions operable to cause a programmable processor to calculate the composite priority parameter value include instructions operable to cause a programmable processor to calculate a sum of all the priority values of all the selected rules.

42. A computer program product, tangibly stored on a computer-readable medium, for adjusting spacing between characters of pairs of characters in a line of text, comprising instructions operable to cause a programmable processor to:
specify a character classification that defines a plurality of character classes, each character class in the plurality of character classes including one or more individual characters as members of the class:
provide a plurality of rules for adjusting spacing between pairs of characters in the line of text to define a line layout, the plurality of rules including two or more rules that are operable to adjust spacing between characters of a first pair of characters in the line of text according to at least one character class, each rule of the two or more rules having a different priority value, the different priority values specifying an order of preference for the two or more rules;
use the different priority values of the two or more rules to select a preferred rule from the two or more rules; and
apply the preferred rule to adjust spacing between characters of the first pair of characters.

43. The computer program product of claim 42, wherein the instructions operable to cause a programmable processor to use the different priority values of the two or more rules to select the preferred rule include instructions operable to cause the programmable processor to:
provide a priority level for the line layout; and
select the preferred rule from the two or more rules based on the priority level for the line layout.

44. The computer program product of claim 42, wherein instructions operable to cause a programmable processor to select a preferred rule from the two or more rules further comprise instructions operable to cause a programmable processor to select a preferred rule from the two or more rules based on character attributes.

* * * * *